United States Patent [19]

Baba et al.

[11] 3,887,534

[45] June 3, 1975

[54] METHOD FOR PRODUCING A MODIFIED CRYSTALLINE PROPYLENE POLYMER

[75] Inventors: Kazuo Baba; Toshiaki Shiota; Kikuo Murakami, all of Niihama; Kazuo Ono, Ehime-ken, all of Japan

[73] Assignee: Sumitomo Chemical Co., Ltd., Osaka-fu, Japan

[22] Filed: Mar. 9, 1973

[21] Appl. No.: 339,927

[30] Foreign Application Priority Data

Mar. 11, 1972 Japan.................................. 47-24933

[52] U.S. Cl. 260/93.7; 260/94.9 GA; 260/94.9 GC; 260/96 D
[51] Int. Cl. ...... C08f 27/22; C08f 27/00; C08f 3/10
[58] Field of Search.. 260/94.9 GA, 94.9 GC, 96 D, 260/93.7

[56] References Cited

UNITED STATES PATENTS

| | | | |
|---|---|---|---|
| 2,916,481 | 12/1959 | Gilmont | 260/94.9 GA |
| 3,086,966 | 4/1963 | Mageli et al. | 260/94.9 GA |
| 3,117,166 | 1/1964 | Harrison et al. | 260/94.9 GA |
| 3,135,805 | 6/1964 | Gilmont | 260/94.9 GA |
| 3,202,648 | 8/1965 | Latourette | 260/94.9 GA |

FOREIGN PATENTS OR APPLICATIONS 14,490   8/1963   Japan .......................... 260/94.9 GC

OTHER PUBLICATIONS

*Chemical Abstracts,* 72: 22287n (1970), Abstract of Japanese Patent 69–15,186.
"Organic Peroxides," *I & EC,* 58, No. 3, pp. 25–32 (1966).

*Primary Examiner*—Joseph L. Schofer
*Assistant Examiner*—A. Holler
*Attorney, Agent, or Firm*—Stewart and Kolasch, Ltd.

[57] ABSTRACT

A method for modification of crystalline propylene polymer which comprises heating a mixture comprising 100 parts by weight of said polymer and 0.001 to 0.5 part by weight of an aliphatic peroxide at a temperature of from 170° to 280°C to diminish the molecular weight of said polymer whereby its processability is much improved, said peroxide having a half life time of from 2.0 to 10.0 hours at 130°C and a vapor pressure of not more than 760 mmHg at 230°C.

15 Claims, No Drawings

METHOD FOR PRODUCING A MODIFIED CRYSTALLINE PROPYLENE POLYMER

The present invention relates to a method for producing a modified crystalline propylene polymer. More particularly, it relates to an improved method in diminishing the molecular weight of crystalline propylene polymer to provide the same with a good processability.

Crystalline propylene polymer has various excellent properties and is used as a fiber, film or any other molded article. When, however, the polymerization of propylene is carried out using the so-called Ziegler-Natta catalyst system, the resulting propylene polymer often has a high molecular weight and, because of its poor melt flow, trouble is encountered upon processing thereof. In order to diminish such high molecular weight and improve the inferior processability thereof, there have heretofore been made some proposals, of which one is to heat an aqueous slurry of propylene polymer in the presence of oxygen and an organic free radical catalyst [Japanese Pat. No. 7221/1963]. Another proposal is to heat a mixture of propylene polymer and a peroxide in a solvent at a temperature from 60° to 250°C in an inert gas which may contain oxygen [Japanese Pat. No. 14490/1963]. A further proposal is to heat a mixture of propylene polymer and a certain peroxide in the absence of oxygen and any medium [Japanese Pat. No. 15186/1969].

In case of the polymer being decomposed by the use of a peroxide or any other compound, it is most important to assure the uniform proceeding of the decomposition. In order to attain this, some attempts were made in the said proposals. Thus, the decomposition was carried out in the water slurry state or in the presence of a solvent. These could afford, however, only an unsatisfactory result in the industrial production. The heating in the presence of an appropriate peroxide without using any medium as above proposed, e.g. in a pelletizing extruder, is the most favorable from the practical viewpoint but the selection of an appropriate peroxide is not easy.

For effecting the decomposition of the polymer uniformly, it is necessary that the peroxide to be used can react on the propylene polymer in an adequate rate at the melt extrusion temperature of the polymer. If the peroxide reacts instantaneously on the polymer, for instance, just at the entrance of a melt extruder, the uniform decomposition is not assured, and the resulting polymer would be made heterogeneous and valueless for the production of film or fiber. To the contrary, the use of a peroxide of which the reaction rate is too slow would leave a portion of the peroxide unreacted in the resulting polymer so that the polymer would become inferior in its stability on processing. Further, the peroxide to be employed must not be readily vaporized at the melt extrusion temperature of the polymer, otherwise it will go off in vapor form before reacting so that the polymer will not be effectively decomposed. Thus, the vapor pressure of the peroxide employed is favorably low. Moreover, the peroxide used should cause no problems as to color and smell with the polymer.

As the results of extensive studies, it has been found that some certain peroxides meet the said requirements. By utilization of such peroxides, an effective and convenient method for diminishing the molecular weight of crystalline propylene polymer to highly improve its processability has been found.

According to the present invention, crystalline propylene polymer (100 parts by weight) is admixed with a certain aliphatic peroxide (0.001 to 0.5 part by weight) and the resulting mixture is heated at a temperature of from 170° to 280°C, favorably in a melt extruder, whereby the molecular weight is sufficiently diminished to improve the processability thereof.

As the starting crystalline propylene polymer, there is usually employed a polymer having an intrinsic viscosity of 1.2 to 10.0 dl/g (determined in tetralin at 135°C), although such range is not essential.

The aliphatic peroxide utilizable in this invention is essentially required to have a half life time of from 2.0 to 10.0 hours at 130°C and a vapor pressure of not more than 760 mmHg at 230°C. Specific examples of the aliphatic peroxide are 2,5-dimethyl-2,5-di-t-butylperoxyhexane, 2,5-dimethyl-2,5-di-t-butylperoxyhexyne-3, etc.

When an aliphatic peroxide having a half life time of less than 2.0 hours at 130°C (e.g. t-butyl hydroperoxide) is used, the resulting polymer is made heterogeneous, and gels are produced in the film manufactured therewith. Further, is substantially impossible to make fibers therefrom. When the half life time at 130°C is more than 10.0 hours, a portion of such peroxide remains unreacted in the polymer in view of the shortness of time in the melt extruder.

Since the aliphatic peroxide used in the invention has a vapor pressure of not more than 760 mmHg at 230°C, it is substantially not vaporized prior to reacting on the polymer and can thus decompose the polymer effectively. In case of using di-t-butyl peroxide of which the boiling temperature is about 111°C, it is easily vaporized and the decomposition efficiency is decreased less than half.

Advantageously, the aliphatic peroxide used in the invention does not afford any unfavorable color and smell on the polymer. In this respect, such a proxide is more excellent than dicumyl peroxide which usually provides the polymer with a bad smell.

The amount of the aliphatic peroxide to be incorporated into the polymer may be varied in a wide range depending on the molecular weight of the polymer and the desired processability of the resulting modified product and is usually from 0.001 to 0.5 part by weight per 100 parts by weight of the polymer.

The heating is normally carried out until the intrinsic viscosity of the polymer is decreased in the amount of 10 to 90 percent. In other words, the heating may be continued until the ratio of the intrinsic viscosity of the polymer after heating to that of the polymer before heating becomes 0.1–0.9 : 1. Under the said heating condition, such decrease in the intrinsic viscosity can be attained usually within a period of 10 seconds to 5 minutes.

As the result of the application of the present invention, there is obtained the modified polymer, of which the intrinsic viscosity is usually from 0.7 to 3.0 dl/g (determined in tetralin at 135°C). Such modified polymer has an excellent processability and a good processing stability without any adverse color or smell.

Practical and presently preferred embodiments of the present invention are illustratively shown in the following Examples wherein parts are by weight. The intrinsic viscosity was measured in tetralin at 135°C, the melt flow index was determined by the method described in JIS (Japan Industrial Standard) K6758-1968 and the haze was determined by the method described in ASTM (American Society for Testing Materials) D1003-61.

EXAMPLE 1

A mixture of 100 parts of crystalline polypropylene powder (intrinsic viscosity, 7.13 dl/g), a designed amount of 2,5-dimethyl-2,5-di-t-butylperoxyhexane (diluted with calcium silicate to a 2 fold dilution) and 0.2 part of 2,6-di-t-butyl-4-methylphenol was pelletized by the use of an extruder with a screw of 65 mm in diameter at a cylinder temperature of 230°C. The intrinsic viscosity and the melt flow index of the modified polymer thus obtained are shown in Table 1.

Table 1

| Amount of 2,5-dimethyl-2,5-di-t-butylperoxy-hexane used (parts) | Intrinsic viscosity (dl/g) | Melt flow index (dg/min.) |
| --- | --- | --- |
| 0 | 4.66 | 0.048 |
| 0.01 | 2.57 | 0.70 |
| 0.03 | 1.74 | 4.4 |
| 0.05 | 1.44 | 10.8 |
| 0.07 | 1.36 | 14.1 |
| 0.10 | 1.13 | 33.6 |
| 0.20 | 0.93 | 94.8 |

EXAMPLE 2

A mixture of 100 parts of crystalline polypropylene pellets (intrinsic viscosity, 2.39 dl/g; melt flow index, 1.0 dg/min.), a designed amount of 2,5-dimethyl-2,5-di-t-butylperoxyhexyne-3 (diluted with paraffin oil) and 0.2 part of 2,6-di-t-butyl-4-methylphenol was pelletized by the use of an extruder with a screw of 65 mm in diameter at a cylinder temperature of 220°C. The intrinsic viscosity and the melt flow index of the modified polymer thus obtained are shown in Table 2.

Table 2

| Amount of 2,5-dimethyl-2,5-di-t-butylperoxy-hexyne-3 used (parts) | Intrinsic viscosity (dl/g) | Melt flow index (dg/min.) |
| --- | --- | --- |
| 0 | 2.32 | 1.2 |
| 0.01 | 1.97 | 2.5 |
| 0.02 | 1.77 | 4.2 |
| 0.03 | 1.63 | 6.3 |
| 0.05 | 1.44 | 10.7 |

The modified polymers obtained in Examples 1 and 2 are somewhat different from an unmodified polymer having the same flow and processability as above in general properties. Thus, the former has a lower stiffness, a higher impact strength and a lower brittle temperature than the latter. The tensile performance is almost unchanged by the modification.

EXAMPLE 3

A mixture of 100 parts of crystalline polypropylene powder (intrinsic viscosity, 2.26 dl/g), 0.006 part of 2,5-dimethyl-2,5-di-t-butylperoxyhexane, 0.2 part of 2,6-di-t-butyl-4-methylphenol, 0.1 part of erucamide and 0.1 part of silicic anhydride was pelletized by the use of an extruder with a screw of 65 mm in diameter at a cylinder temperature of 210°C and a die temperature of 220°C. The intrinsic viscosity and the melt flow index of the pellets thus obtained were 1.74 dl/g and 5.64 dg/min, respectively.

By the use of a film processing machine having a 40 mm screw extruder and a 40 cm width coathanger die, the pellets were extruded at 240°C, and the melt was cast and cooled rapidly on a chill roll where cooling water of about 20°C is circulated to give a film of 0.03 mm in thickness. Upon macroscopic observation of the film, irregularities and fish eyes were scarcely found. The haze was very good, i.e. 1.0 percent.

EXAMPLE 4

A mixture of 100 parts of crystalline polypropylene powder (intrinsic viscosity, 3.10 dl/g), 0.004 part of 2,5-dimethyl-2,5-di-t-butylperoxyhexane and 0.2 part of 2,6-di-t-butyl-4-methylphenol was pelletized by the use of an extruder with a screw of 65 mm in diameter at a cylinder temperature of 220°C and a die temperature of 230°C. The intrinsic viscosity and the melt flow index of the pellets thus obtained were 2.04 dl/g and 2.40 dg/min, respectively.

By the use of a film processing machine having a 40 mm screw extruder and a 40 cm width coathanger die, the pellets were extruded at 270°C, and the melt was cast and cooled rapidly on a chill roll where cooling water of about 20°C is circulated to give a cast film of 0.4 mm in thickness. The cast film was stretched in a stretch ratio of 3 in the mechanical direction at a roll temperature of 165°C and then in a stretch ratio of 7 in the mechanical and transverse directions on a tenter at 160°C, followed by annealing at 125°C under tension. Upon macroscopic observation of the film, irregularities and fish eyes were scarcely found. The haze was very good, i.e. 0.2 percent.

EXAMPLE 5

A mixture of 100 parts of crystalline polypropylene powder (intrinsic viscosity, 1.57 dl/g), 0.05 part of 2,5-dimethyl-2,5-di-t-butylperoxyhexane and 0.2 part of 2,6-di-t-butyl-4-methylphenol was cast into the hopper of a screw extruder and extruded under a nitrogen atmosphere. The extrusion was carried out at a temperature of 210°C on the cylinder center and the forehand edge. The intrinsic viscosity of the pellets thus obtained was 0.92 dl/g.

The pellets were melt-spun in a conventional manner to make fibers of 195 denier/24 fibers at 240°C. The spinning was very easy and stable. The obtained unstretched fiber was stretched in a stretch ratio of 5.7 to give a very strong stretched fiber with a tensile strength of 8.8 g/denier.

EXAMPLE 6

A mixture of 100 parts of crystalline polypropylene powder (intrinsic viscosity, 3.10 dl/g), 0.1 part of 2,5-dimethyl-2,5-di-t-butylperoxyhexane and 0.2 part of 2,6-di-t-butyl-4-methylphenol was extruded by the use of a pelletizer at 230°C. The intrinsic viscosity of the pellets thus obtained was 0.90 dl/g.

The pellets were melt-spun in a conventional manner to make fibers of 195 denier/24 fibers at 240°C. The spinning was very easy and stable. The obtained unstretched fiber was stretched in a stretch ratio of 5.7 to give a very strong stretched fiber with a tensile strength of 8.0 g/denier.

What is claimed is:

1. A method for the modification of crystalline propylene polymer which comprises heating a mixture comprising 100 parts by weight of said polymer and 0.001 to 0.5 part by weight of an aliphatic peroxide at a temperature of from 170 to 280°C, said peroxide having a half life time of from 2.0 to 10.0 hours at 130°C and a vapor pressure of not more than 760 mmHg at 230°C.

2. The method according to claim 1, wherein the aliphatic peroxide is 2,5-dimethyl-2,5-di-t-butylperoxyhexane.

3. The method according to claim 1, wherein the aliphatic peroxide is 2,5-dimethyl-2,5-di-t-butylperoxyhexyne-3.

4. In a method for the modification of crystalline propylene polymer by heating with an aliphatic peroxide at a temperature of from 170° to 280°C. to diminish the molecular weight and improve the processability thereof, the improvement which comprises utilizing an aliphatic peroxide having a half life time of from 2.0 to 10.0 hours at 130°C. and a vapor pressure of not more than 760 mmHg at 230°C.

5. The method according to claim 4, wherein the aliphatic peroxide is 2,5-dimethyl-2,5-di-t-butylperoxyhexane.

6. The method according to claim 4, wherein the aliphatic peroxide is 2,5-dimethyl-2,5-di-t-butylperoxyhexyne-3.

7. The method according to claim 4, wherein 0.001 to 0.5 part by weight of the aliphatic peroxide is used per 100 parts by weight of the polymer.

8. The method according to claim 1, wherein the polymer before heating has an intrinsic viscosity of 1.2 to 10.0 dl/g (determined in tetralin at 135°C).

9. The method according to claim 1, wherein the polymer after heating has an intrinsic viscosity of 0.7 to 3.0 dl/g (determined in tetralin at 135°C).

10. The method according to claim 1, wherein the heating is effected until the intrinsic viscosity of the polymer is decreased in the amount of 10 to 90 percent.

11. The method according to claim 1, wherein the heating is effected for 10 seconds to 5 minutes.

12. The method according to claim 1, wherein the heating is carried out in a melt extruder.

13. A modified crystalline propylene polymer having a diminished molecular weight and an improved processability, prepared by the method of claim 1.

14. A method for the modification of crystalline propylene polymer in the absence of a solvent which comprises heating a mixture consisting essentially of 100 parts by weight of said polymer and 0.001 to 0.5 part by weight of an aliphatic peroxide in a melt extruder at a temperature of from 170° to 280°C., said peroxide having a half life time of from 2.0 to 10.0 hours at 130°C. and a vapor pressure of not more than 760 mmHg at 230°C.

15. The method according to claim 14, wherein the aliphatic peroxide is selected from the group consisting of 2,5-dimethyl-2,5-di-t-butylperoxyhexane and 2,5-dimethyl-2,5-di-t-butylperoxyhexyne-3.

* * * * *